E. C. LOVELL.
MACHINE FOR MAKING CYLINDERS OF CARDBOARD AND THE LIKE.
APPLICATION FILED JAN. 25, 1912.

1,056,191.

Patented Mar. 18, 1913.
7 SHEETS—SHEET 1.

Fig. 1.

Witnesses:
Peter Henry
H. D. Penney

Inventor:
Edward C. Lovell,
By his Attorney, F. H. Richards.

E. C. LOVELL.
MACHINE FOR MAKING CYLINDERS OF CARDBOARD AND THE LIKE.
APPLICATION FILED JAN. 25, 1912.

1,056,191.

Patented Mar. 18, 1913.

Witnesses:

Inventor:
Edward C. Lovell,
By his Attorney,

E. C. LOVELL.
MACHINE FOR MAKING CYLINDERS OF CARDBOARD AND THE LIKE.
APPLICATION FILED JAN. 25, 1912.

1,056,191.

Patented Mar. 18, 1913.

Witnesses:

Inventor:
Edward C. Lovell,
By his Attorney,

UNITED STATES PATENT OFFICE.

EDWARD COLSTON LOVELL, OF BRISTOL, ENGLAND.

MACHINE FOR MAKING CYLINDERS OF CARDBOARD AND THE LIKE.

1,056,191.　　　　　Specification of Letters Patent.　　Patented Mar. 18, 1913.

Application filed January 25, 1912. Serial No. 673,334.

*To all whom it may concern:*

Be it known that I, EDWARD COLSTON LOVELL, a subject of the King of Great Britain, residing in Bristol, England, have invented certain new and useful Improvements in Machines for Making Cylinders of Cardboard and the Like, of which the following is a specification.

This invention relates to an improved machine for making cylinders of cardboard and the like, and it has for its object to provide a simple and efficient machine whereby cardboard cylinders having an internal coating of wax may be produced in a rapid and economical manner.

According to the present invention the cylinders are formed from a continuous roll or web of card-board or the like of a width sufficient to give the desired length for making the cylinder when cut transversely of its length. The cardboard is fed intermittently to mechanism whereby it has applied to it upon its under surface along one edge a coating of wax. The width of the wax coated surface is sufficient to form the aforesaid internal coating above referred to, and after the wax has been applied the cardboard is cut transversely of its length and the severed sheet is pushed forward until it is in a position to be fed to the mechanism for rolling the card to form the cylinder, glue or other adhesive being applied to the end of the card as it is being drawn on to the rolling mandrel or former. The cylinder when completed is stripped or removed from the former by means of a collar arranged to normally occupy a position at one end of the former, and which collar is caused at stated intervals to move to and fro thereon to remove the completed cylinder.

In order that the invention may be the better understood, drawings are appended in which:—

Referring to the accompanying drawings, 1 and 2 indicate frames connected together by means of stays not shown, and which frames support bearers or brackets 3, 4 to which are connected the ends of transverse bearers or brackets 5, 6 upon which is mounted a glue receptacle 7 which is heated by means of a steam jacket $w$ beneath said receptacle. The frames 1 and 2 also serve to support the plate 8 upon which are mounted the former and other parts of the machine.

Figure 1:
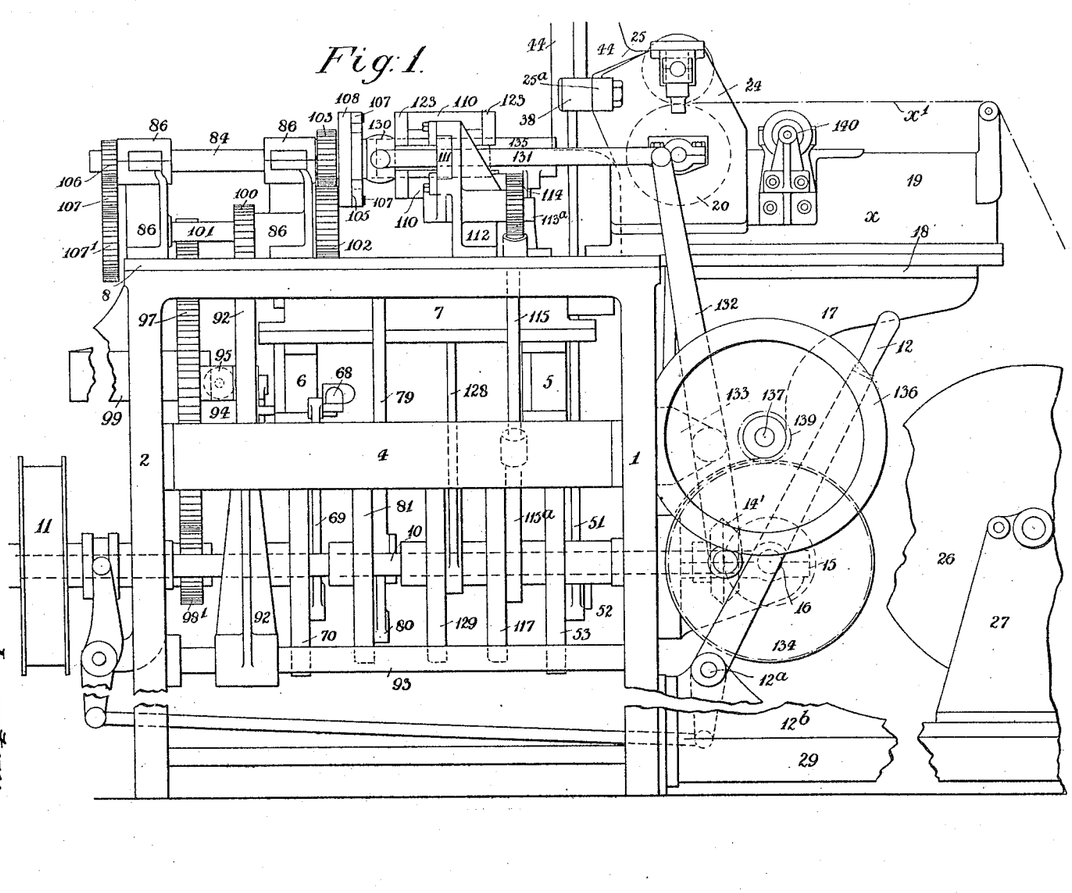
Figure 1, is a side elevation of a machine constructed in accordance with the present invention.
Figure 2:
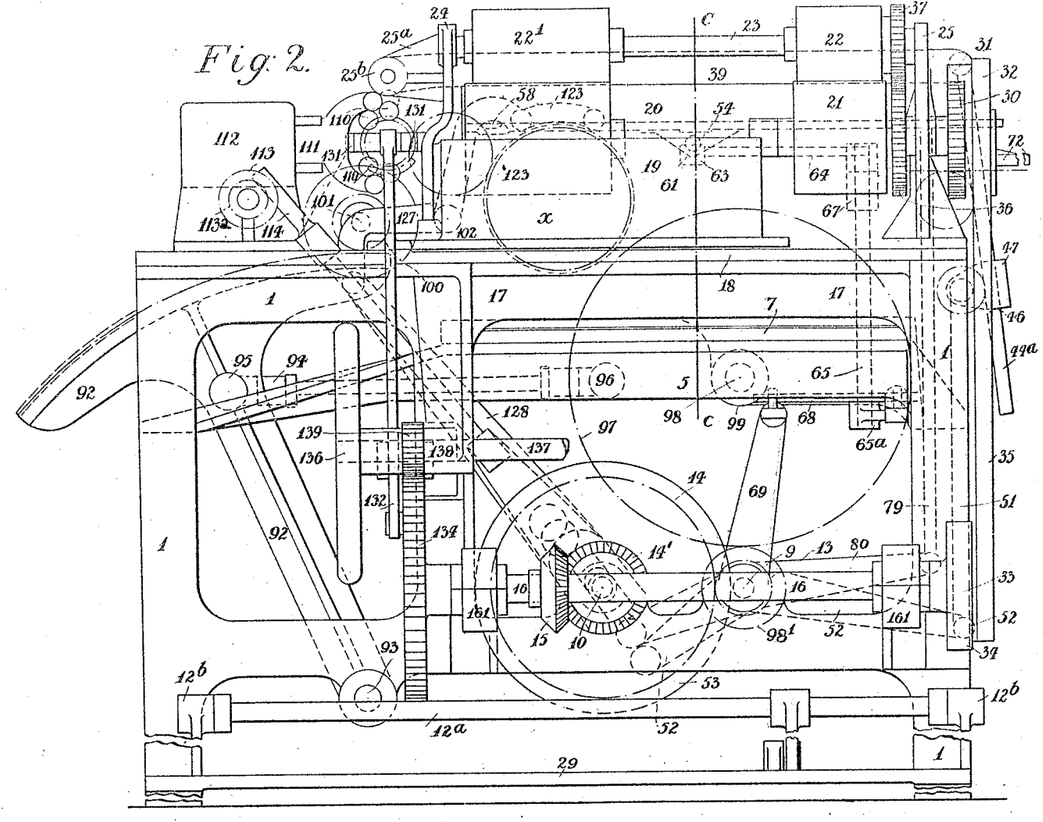
Fig. 2, is a front end elevation.
Figure 3:
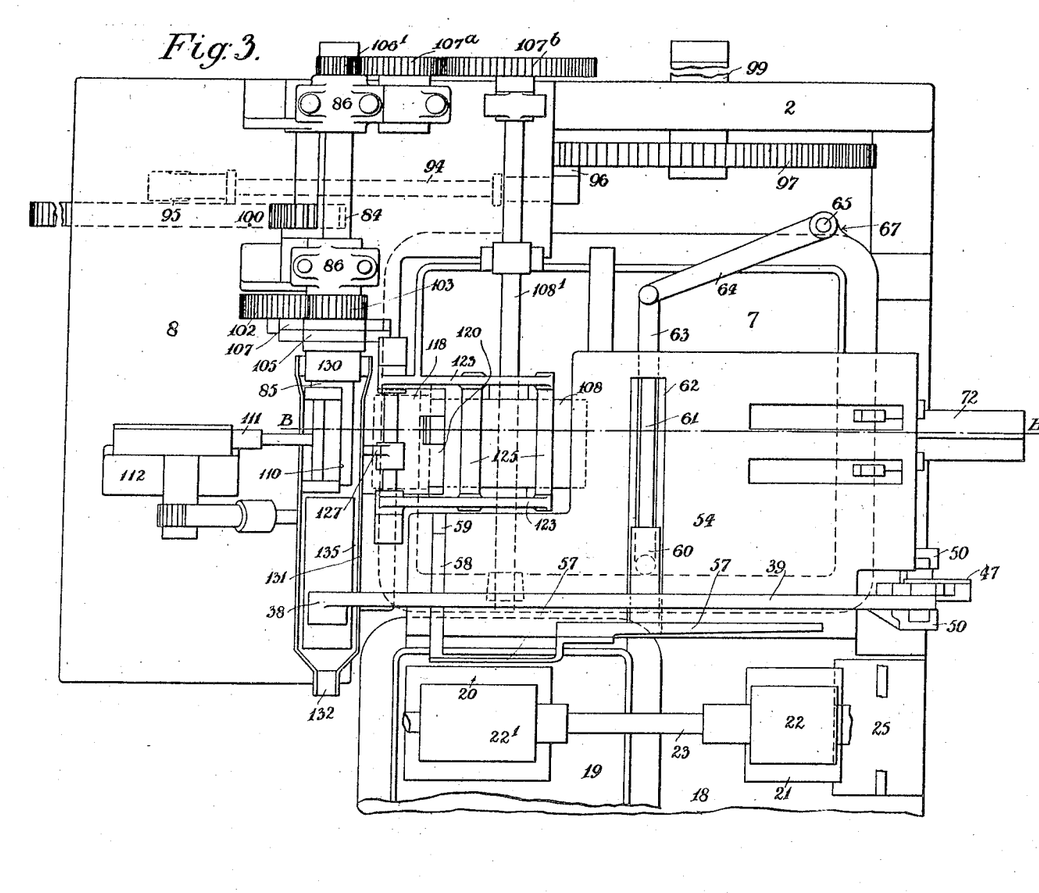
Fig. 3, is a plan from which however certain parts are omitted for the sake of clearness.

Formed upon the frames 1 and 2 are bearings for shafts 9, 10, one of which shafts 9 is provided with a driving pulley 11 which may be clutched to the said shaft by means of the handle 12, mounted on the spindle 12$^a$ carried in bracket 12$^b$, see Figs. 1 and 2. The shaft 9 is also provided with a pinion 13 in gear with a pinion 14 upon shaft 10, motion being transmitted from the shaft 9 to the shaft 10 through said pinion. The shaft 10 at its opposite end is provided with a miter wheel 14 in gear with a second miter wheel 15 mounted upon a shaft 16 arranged at the front end of the machine and for which shaft brackets 16$^1$ are provided upon the frame 1.

Bolted or otherwise secured to frame 1 are two brackets 17 which support a table 18 upon which is mounted the wax receptacle which as in the case of the glue receptacle already referred to is heated by a steam jacket or space $x$ beneath it. The wax receptacle just referred to comprises a rectangular box like body 19 mounted upon the aforesaid extension 18 and provided at the sides with bearings for the spindle of a roller 20 which is immersed in the wax in the receptacle. The spindle of the roller 20 is extended beyond the limits of the receptacle upon one side, and it has secured to it a second roller 21 which acts in conjunction with a roller 22 upon a spindle 23 carried at one end in a bracket 24 secured to the side of the wax reservoir and at the other in a bracket 25 mounted upon the extension 18. A second roller $22^1$ upon spindle 23 bears against the top of the web of card-board, and the set of rollers in addition to feeding the material $x^1$ forward from the roll 26, mounted in brackets such as 27 secured to an extension 29 attached to the sides of one of the frames of the machine, serve to apply by means of roller 20, a coating of wax along one edge of the cardboard. The coated surface, as will be hereinafter described, is disposed upon the inside of the cylinder. The movement of the feed and wax rollers is intermittent, and is obtained by means of a ratchet wheel 30 secured to the spindle of rollers 20 and 21 operated by means of a pawl, or as in the present instance by means of three pawls 31 secured to a body 32, see Figs. 2, 13, 14 and 15, freely mounted upon the end of the spindle of the rollers 20, 21. The employment of the pawls is only requisite in order to obtain the exact feed without employing a wheel having teeth of very small pitch, and with this object, the said pawls are set so that they each come into operation at each third stroke. The body 32 is actuated by means of a crank, the arrangement comprising a body 33 secured to the shaft 16, and slotted to receive a pin 34 adjustable in said slot, and to which pin is connected one end of a rod 35, see Figs. 2, 13, 14 and 15. The upper end of the rod 35 is provided with teeth which engage teeth $32^1$ upon the body 32 as shown, and the said rod is supported by means of a hanging guide or bracket freely mounted upon each side of the body 32. The motion of the spindle of rollers 20, 21 is transmitted to spindle 23 by means of a pinion 36 upon said first spindle which engages a second pinion 37 upon spindle 23.

In addition to carrying the spindle 23 just referred to, the brackets 24, 25 serve respectively to support the end of the movable member of the knife and the guide for the knife as also the support for the fixed blade of said knife. With this object in view the bracket 24 is provided with an arm $25^a$ on which is provided a bearing $25^b$ for a pin engaging an eye 38 upon one end of a beam or bar 39, to which is secured the upper member of the knife or shears by which the requisite length of card is cut from the web. The knife is arranged behind the wax receptacle in Figs. 1, 2, 3, 8, 9 and 12, and the fixed blade 40 thereof is supported by projections such as 42, Fig. 8 formed upon the inner faces of brackets 24, 25, and to which the ends of the bar 43 supporting the blade 40 are bolted or otherwise secured. The movable member at its outer end is located between guides 44 attached to the bracket 25, see Fig. 8, and at said outer end there is secured one end of a rod $44^a$ having at its opposite end teeth 45 engaging a pinion 46, see Figs. 2, 3, 4, 8, 9 and 10, the spindle of which is freely mounted in a guide 47 which maintains the rod $44^a$ in a position with its teeth in engagement with the teeth of the aforesaid pinion 46. The pinion is also in gear with a rack 48 secured within a recess 49 in a bracket 50 secured to the side of the glue receptacle 7, see Figs. 4, 9 and 10. The spindle of the pinion 46 is extended upon each side of the guide 47 and is engaged by the upper end of a rod 51, which rod at its lower end is connected to a bell crank lever 52 loosely mounted on shaft 9 and carrying a roller engaging a cam race in the side of a disk 53 mounted upon the shaft 10, see Figs. 1 and 2.

Arranged above the plate 8 is a table 54 supported at one end by means of a U shaped plate 55, the ends of which are bolted or otherwise secured to the opposite ends of the glue receptacle, see Figs. 2, 3, 4, 11 and 12, and at the other by means of short columns 56 secured at one end to the underside of the table 54, and at the other provided with screwed extensions which enter tapped holes in the web $a$ of the gummed receptacle. The table at one end terminates at a point adjacent the feed rollers so that when the card $x^1$ is cut transversely of its length, the severed portion falls on to the said table 54, upon which it is supported until presented to the former. In order that it may be brought into a position ready to be presented to the former, it is necessary that it shall first be advanced toward the opposite end of the machine in front of the former, and the necessary movement is effected by means of the plate or bar 57, Figs. 3 and 12. The plate 57 is formed in two parts, one of which is provided with a member 58 adapted to enter and slide within a channel 59 formed in the upper surface of the table 54. The other portion of the plate 57 rests upon the upper surface of the table 54 and has secured to it a perforated lug or boss which engages a rod 61 secured beneath the table 54, which table is slotted at 62 for the passage of the engaging member 60. Secured to the boss 60 is one end of a link 63 attached at its opposite end to an arm 64, which arm is secured to the upper end of a spindle 65. The spindle 65 at one end is supported by a bearing 66 formed upon one of the transverse brackets supporting the glue receptacle, a second bearing being provided at 67 upon the glue receptacle itself. Secured to the lower end of spindle 65 is a second arm 65ª to which is attached one end of a rod indicated by 68, the other end of said rod being secured to the upper end of one member of a bell crank lever 69 loosely mounted upon shaft 9 and actuated by means of a roller upon the other member which engages a cam race formed in the side of a disk 70, see Figs. 1 and 2. The card-board when moved forward by the parts just described is left in a position ready for feeding to the former. A fence or stop is provided upon the table 54 in order to correctly position the card-board ready for feeding to the former. The movement just referred to is effected by means of the fingers 71 which are mounted upon a slide 72, and which fingers project through apertures in the table 54. The slide 72 is mounted in guides 73 formed upon a bracket 74 secured to the side of the glue receptacle, see Figs. 2, 3, 4, 7 and 11. The reciprocation of the slide 72 is effected by means of a rack 75 secured to the underside of the slide, and with which rack engages a pinion 76 mounted upon a spindle 77 carried by the bracket 74. The spindle at its outer end has secured to it a second pinion 77 with which engages a rack 78 at the upper end of the rod 79, which rod at its lower end is attached to a bell crank lever 80, loosely mounted upon shaft 9 and operated by means of a cam race formed in the face of a disk 81 upon the shaft 10. The rack 78 is maintained in gear with its pinion by means of a roller 82 carried by a suitable pin supported upon the side of the bracket, see Fig. 7.

Figure 5:
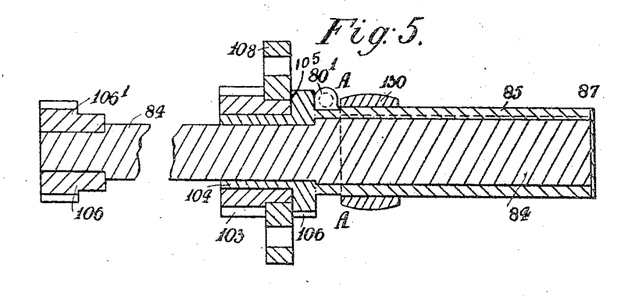
Fig. 5, is a longitudinal section of the former upon which the cylinders are made.
Figure 6:
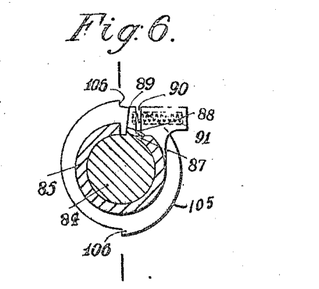
Fig. 6, is a transverse section of the former on line A A Fig. 5.

The former upon which the cardboard is wound to form the cylinder is arranged at a right angle to the line of the webbing and the spindles of the gum rollers are arranged parallel to the axis of the former. The former comprises a body made in two parts 84 and 85, see Figs. 5 and 6. The portion 84 is extended as shown in the form of a spindle and has freely mounted upon it at its other end the other portion 85. The former is supported upon the plate 8 by means of the brackets 86 mounted upon said plate, and which brackets are provided with bearings in which is free to rotate the extension of part 84. Running parallel to the axis of the former, and disposed upon the periphery of the part 84 is a projection 87 extending along that portion of the part 84 which is covered by the part 85 and the projection 87 is provided upon one side with a lip 88 which as will be presently described, engages the edge of the card-board and retains it while it is being wound around the former. The outer portion 85 of the former is cut away for the passage of the body of the peripheral projection on part 84 so that the lip 88 overhangs the side of the channel which is flattened to receive it. At one end the part 84 is provided with a lug 89 recessed upon one face, the recess serving to receive the end of a helical spring 90, the opposite end or body of which spring is contained within a chamber formed to receive it within a lug 91 upon the end of the other or outer member 85. Normally the parts are retained by the spring 90 in a position such that there is a clear passage between the lip and the slot in the part 85 for the end of the cardboard strip. When, however, the former is caused to rotate, the lip is moved forward and engages the end of the card strip, which as aforesaid, it then retains, during the time the rest of the strip is wrapped or wound around the former. There is a sufficient lag between the two members of the former to permit the proper movement of the lip prior to the rotation of the outer portion 85, and if desired, provision may be made whereby this may be insured by providing some frictional or braking means whereby the outer member is caused to lag somewhat, and there is the desired lost motion between the parts.

Figure 4:
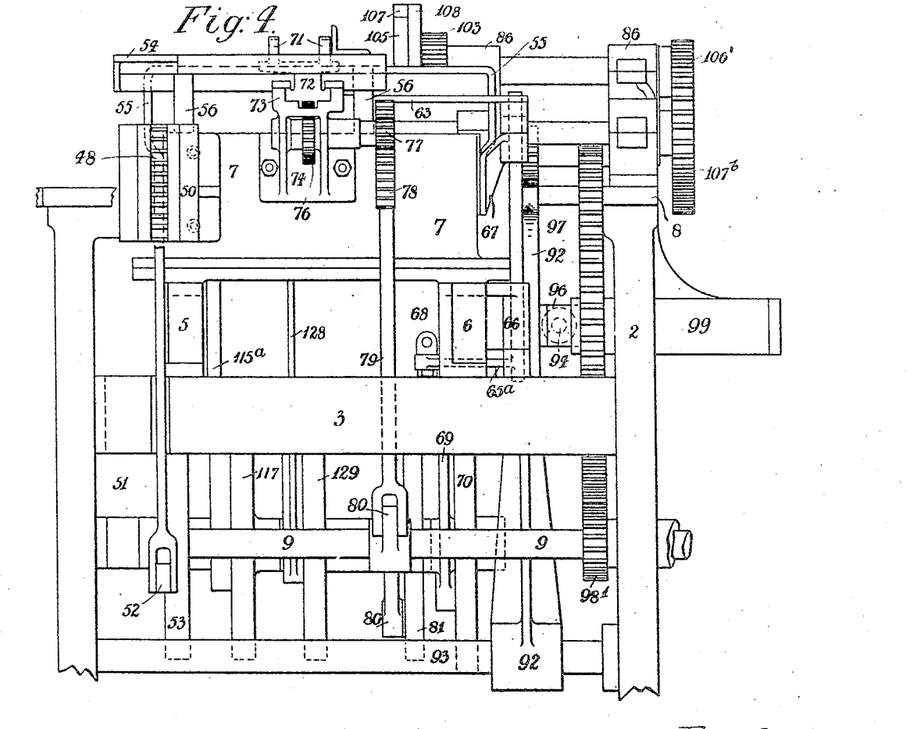
Fig. 4, is an elevation showing part of the mechanism upon the opposite side of the machine to that shown in Fig. 1.

The rotation of the former is effected by means of the toothed sector, 92, Figs. 1, 2, and 4, and which sector is mounted upon a shaft 93 carried in bearings upon the end frames of the machine. The sector is caused to oscillate upon its support by means of a pitman 94 connected at one end to a pin 95 mounted upon the face of the sector, said pitman being connected at its opposite end to a pin 96 adjustably mounted upon the inner face of the pinion 97 mounted upon a pin 98 for which a bracket 99 is provided upon the end frame 2 of the machine. The pinion 97 is in gear with and receives motion from a second pinion 98¹ mounted upon the shaft 9. The sector 92 engages a pinion 100 mounted upon a shaft 101 carried in bearings formed upon the brackets 86. The shaft is parallel to the spindle of the former, and it has secured to it a second pinion 102 which engages a pinion 103 upon the sleeve 104 of the disk 105 secured to the pinion. The disk 105 is provided upon its periphery with two teeth 106 which are designed to be engaged by pawls 107 mounted upon the elliptical plate 108, which plate is secured to an extension or sleeve of pinion 103, see Figs. 5, 6, and 18. Thus as the sector moves in one direction the pawls are permitted to engage the teeth on disk 105, which thereupon rotates first compressing spring 90 and moving until the engagement of the projection on the inner member of the former with the side of the slot in the outer member causes the two parts to rotate as one. In addition to the pinion 103 the spindle of the former at its outer end is provided with a pinion 106¹ which engages a second pinion 107ª whereby motion is transmitted to a third pinion 107ᵇ mounted upon a spindle 108¹ upon which is secured the drum 109 whereby glue is applied to the end of the card strip at the end thereof as it passes on to the former. The various gear wheels just referred to are indicated by dotted lines in Fig. 2.

Figures 17, 18:
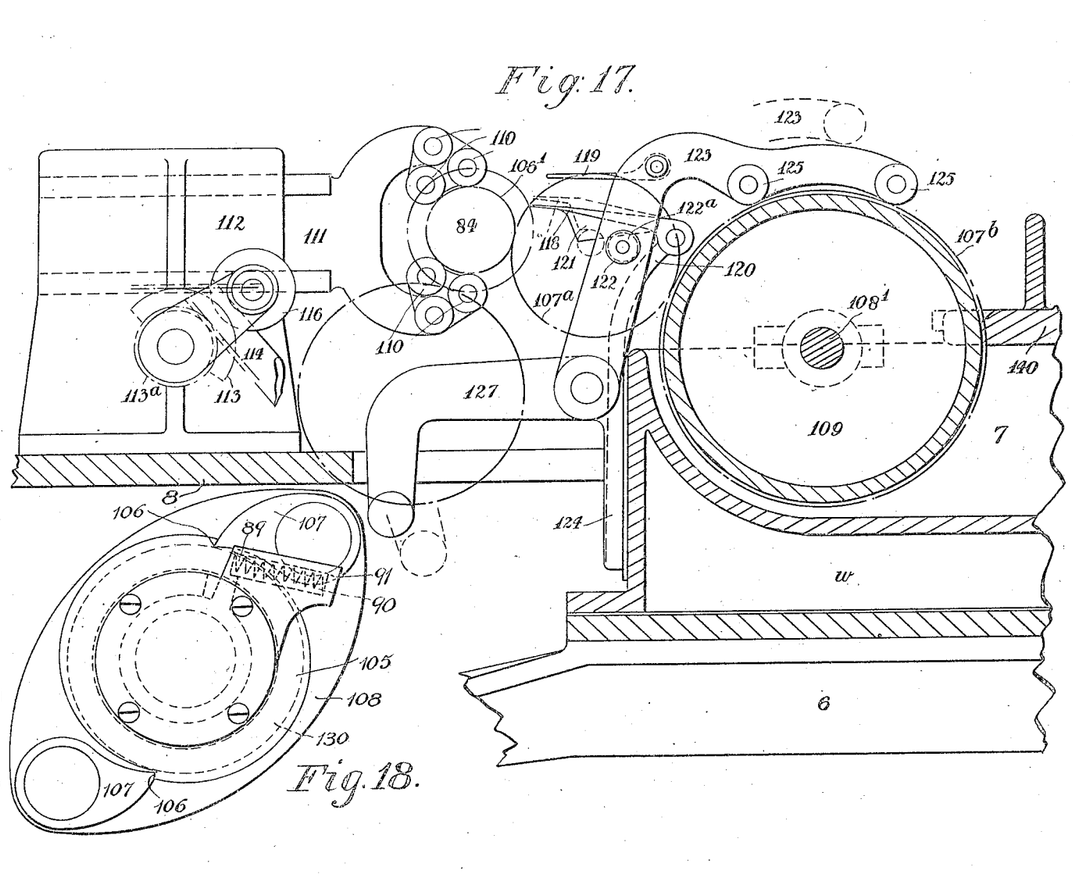
Fig. 17, is a sectional view showing the mechanism for forming the cylinder, and applying the gum to the end of the blank.
Fig. 18, is an end view of the former.

In order that the card-board may be tightly applied to the former, I provide two series of rollers 110 which are designed to press upon the card $x^1$ as it is wound around the former. The rollers shown in Figs. 1, 2, and 17, are carried in a frame mounted upon the inner end of a slide 111 supported in guides in a bracket 112. The reciprocation of the slide 111 is effected by means of a pinion 113 mounted on the bracket, and which pinion engages a rack formed upon the slide 111. The spindle of the pinion 113 is provided with a second pinion 113ª which is engaged by a rack 114 at the upper end of the rod 115. The rack is held in contact with the pinion by means of a guide roller 116 mounted upon the side of the bracket 112. The rod 115 at its lower end is secured to a forked member 115ª straddling shaft 10, and carrying a roller engaging a cam race formed in the side of a disk 117 mounted upon said shaft 10. As aforesaid the card-board is pushed forward to the former by means of the fingers 71, and as it is moved forward it passes between plates 118, 119. Fig. 17 by which it is for the time being held clear of the glue roller; the plates 118 and 119 being at this period in a plane above the periphery of the roller 109. The plate 118 is pivotally mounted upon a bracket 120 secured to the side of the glue reservoir, and it is provided upon its under surface with a projection or surface 121 designed to be engaged by a roller 122 carried by a spindle 122ª mounted on the arms 123 which are pivotally mounted in a bracket 124 also secured to the side of the glue receptacle. The arms 123 are shaped as shown, and they overhang the glue cylinder at their inner end where they are provided with rollers 125. The arms also carry a plate 119 which acting in conjunction with plate 118 acts as a guide to insure the proper presentation of the end of the strip to the former. The arms 123 aforesaid are caused to rock about their pivot by means of an arm 127 secured to their spindle, and which arm is connected to the upper end of a rod 128, see Fig. 2. The rod 128 is bifurcated at its lower end and straddles the shaft 10, which shaft has mounted on it a disk 129 having a cam race which is engaged by a roller upon the said rod 128. When the card $x^1$ is fed forward the arms 123 are in the position indicated by the dotted lines in Fig. 17, and the said arms in their rearward movement cause the roller 122 to act upon the underside of surface 121 whereby the plate 118 is raised as indicated by dotted lines in the aforesaid Fig. 17. At the same time the plate 119 is brought down toward the plate 118, the two as aforesaid forming a guide for the card $x^1$ which is thus retained in a position such as to insure its proper presentation to the former. With the parts in the position just described, the card $x^1$, which passes under the rollers 125, is held clear of the glue cylinder. When, however, the card $x^1$ has been drawn on to the former the desired distance to avoid any glue coming into contact with the waxed under surface of the card $x^1$, the arms 123 are rocked at the same time the plate 118 is lowered to bring the edge of the blank into alinement with the axis of the former and the rollers 125 thereon press the card $x^1$ on to the cylinder, and it has imparted to its under surface a coating of adhesive sufficient to insure the proper securing of the outer convolutions of the card cylinder.

Figures 7, 8, 9, 10, 19, 20, 21:
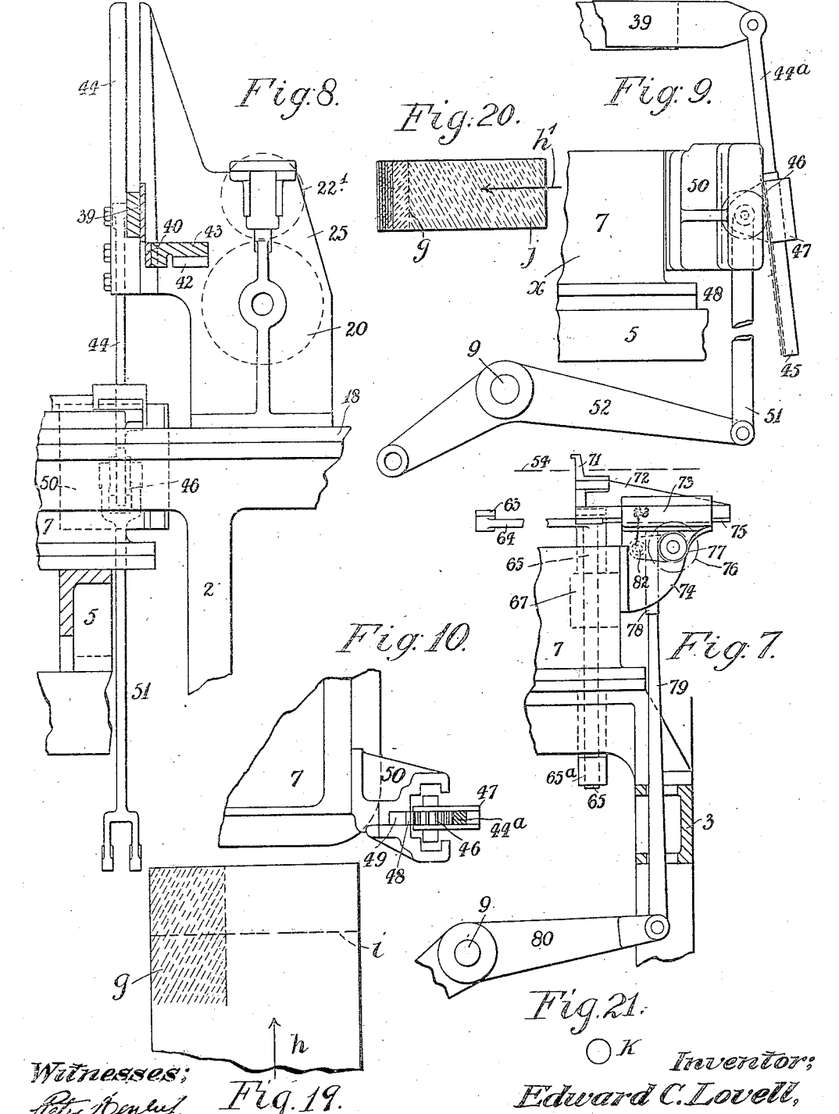
Fig. 7, is a side elevation of the mechanism for feeding the waxed strip of card to the former.
Fig. 8, is a side elevation partly in section showing the arrangement of the knife and the mechanism operating same.
Fig. 9, is a front elevation showing the operative mechanism for the knife.
Fig. 10, is a plan of the said mechanism.
Figs. 19, 20 and 21 are views illustrating different stages in the formation of the cylinder.

The parts are shown in the position just above referred to in the full lines in Fig. 17. The formation of the cylinder is illustrated in Figs. 19 to 21 from which it will be seen that the card $x^1$ is first of all fed from the roll, and during its passage through the feeding rollers it has applied to it a wax coating $g$ along one edge. The coating is upon the underside and is indicated in Figs. 19 and 20 by the broken dotted lines $g$, the direction of motion being indicated by the arrow $h$ and the line of severance by the dotted line $i$. The partially rolled card shown in Fig. 20, and which is moving at a right angle to the line of motion during the waxing operation, as indicated by the arrow $h^1$, has applied to the end clear of the aforesaid waxed surface, a coating of glue $j$ whereby the final convolutions of the card are secured. The cylinder K when its formation is completed is removed or stripped from the former by means of the annular body 130, Figs. 1, 3, and 5, and also shown in dotted lines in Fig. 18, and which body encircles the body of the former, and is caused to reciprocate thereon by means of the links 131 pivotally connected at one end to the said annular body, and at the other end to the upper end of a lever 132, Figs. 1, 2, and 3, and which lever is pivotally mounted upon a bracket 133 secured to the frame of the machine, and carries at its lower end a roller engaging a cam race formed in the side of a pinion 134. The inner of the links 131 is suitably bent or shaped to avoid interfering with the passage of the card to the former. The pinion 134 is mounted upon the aforesaid shaft 16. The cylinder, when stripped from the former is received by a tubular body 135 arranged in line with and at the end of the former, and it is retained in said body during such time as the next cylinder is being made in order that any unrolling of the card may be prevented. When the next cylinder is stripped from the former it pushes the first one out of the aforesaid tubular body 135, a chute or receptacle being provided to receive it.

In order to turn the machine by hand, a hand wheel 136 is provided mounted upon a shaft 137 carried in bearings upon brackets such as 138 secured to the end of the frame of the machine. A pinion 139 is secured to the shaft 137, which pinion is in gear with the pinion 134.

Figure 11:
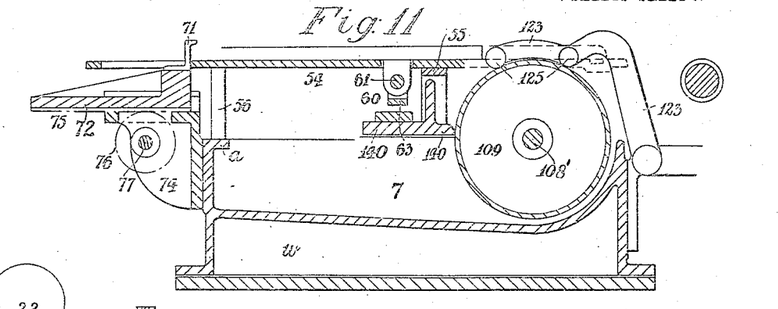
Fig. 11, is a sectional elevation on line B B Fig. 3, showing the general arrangement of the feed for the waxed card together with the table for said card.
Figures 12, 13, 14, 15, 16:
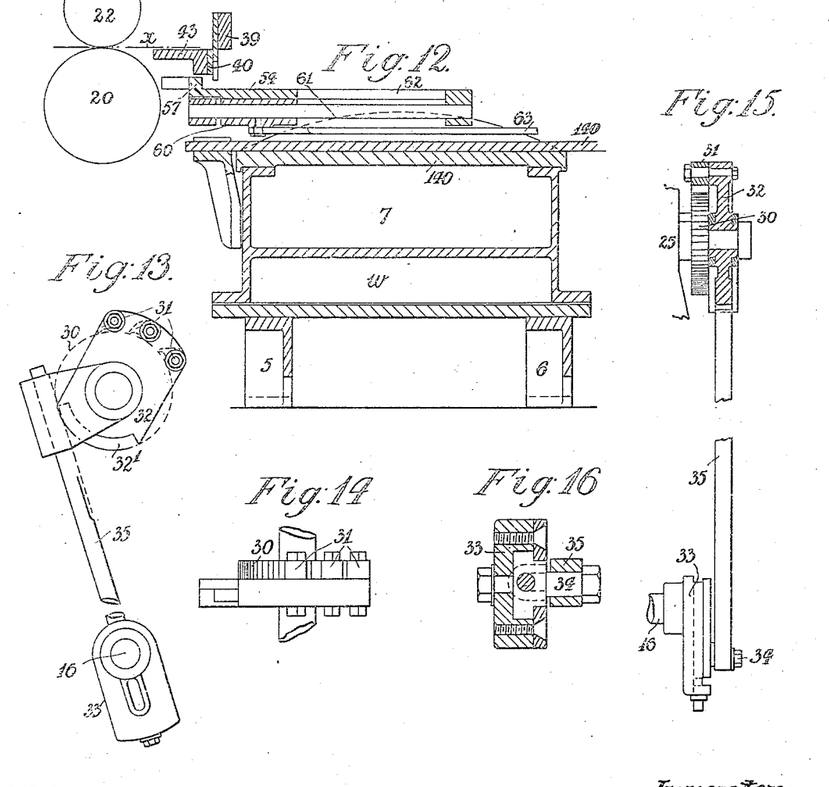
Fig. 12, is a sectional elevation on line C C, Fig. 2, showing the arrangement of the knife and the means for removing the card when severed and placing it in position to be engaged by the means for feeding it to the former.
Fig. 13, is a side elevation showing the operative means for the waxing and feed rollers.
Fig. 14, is a plan.
Fig. 15, is a sectional view of the ratchet and pawl mechanism for the above feed.
Fig. 16, is a sectional plan of part of the said feed.

Scrapers 140 are provided to regulate the amount of glue $j$ and wax upon the respective rollers. These scrapers may be of any desired form, and they are shown in Figs. 1, 11 and 12, said scrapers being supported by brackets attached to the sides of the respective receptacles. I may in some instances dispense with a scraper for the wax cylinder.

Claims:

1. A machine for making cylinders from a web of carboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, means for moving it at a right angle to the line of the first movement, means for applying adhesive to the undersurface of the waxed severed portion, means for rolling the waxed severed portion to form a cylinder, mechanism for removing the cylinder from the rolling mechanism, and means for receiving it after its removal.

2. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, a series of slots in said table, fingers passing through said slots, for moving the cut portion at a right angle to the line of its first movement, means for applying adhesive to the undersurface of the waxed severed portion, mechanism for rolling the waxed severed portion to form a cylinder, mechanism for removing the cylinder from the rolling mechanism, and means for receiving it after its removal.

3. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, means for pressing the rear end of the cut portion of the web upon the gum roller, mechanism for rolling the waxed severed portion to form a cylinder, mechanism for removing the cylinder from the rolling mechanism, and means for receiving it on its removal.

4. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, a rocking frame carrying rollers acting upon the upper surface of the severed portion to press the underside of the severed portion into contact with the gum roller, mechanism for rolling the said portion to form a cylinder, mechanism for removing the cylinder from the rolling mechanism, and means for receiving it after its removal.

5. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, a rocking frame carrying rollers acting upon the upper surface of the severed portion to press the underside thereof into contact with the gum roller, an intermittently rotating body for forming the cylinder having jaws to grip the edge of the severed portion, a reciprocating body carrying rollers designed to press the severed portion into contact with said intermittently rotating body, mechanism for removing the cylinder from the same, and means for retaining the cylinder when removed.

6. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, a rocking frame carrying rollers acting upon the upper surface of the severed portion to press the underside thereof into contact with the gum roller, an intermittently rotating body for forming the cylinder having jaws to grip the edge of the severed portion, a reciprocating body carrying rollers designed to press the severed portion into contact with said intermittently rotating body, an annular body surrounding the same, mechanism for moving said body longitudinally of said intermittently rotating body, and means for retaining the cylinder when removed.

7. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, a rocking frame carrying rollers acting upon the upper surface of the severed portion to press the underside thereof into contact with the gum roller, an intermittently rotating body for forming the cylinder having jaws to grip the edge of the severed portion, a reciprocating body carrying rollers designed to press the severed portion into contact with said intermittently rotating body, an annular body surrounding the same, mechanism for moving said body longitudinally of said intermittently rotating body, a fixed annular body for receiving the finished cylinder arranged with its center coincident with the longitudinal axis of the intermittently rotating body.

8. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, a rocking frame carrying rollers acting upon the upper surface of the severed portion to press the underside thereof into contact with the gum roller, an intermittently rotated body, a longitudinal projection upon said body, a sleeve upon said body, a longitudinal slot in said sleeve, a projection upon said sleeve, a second projection upon the intermittently rotated body, a spring interposed between the projections, an annular body surrounding the sleeve, means for moving said body longitudinally of said sleeve, a fixed annular body for receiving the finished cylinder having its center coincident with the longitudinal axis of the former.

9. A machine for making cylinders from a web of cardboard, comprising intermittently operated rollers, a wax receptacle in which one of the rollers is immersed, a fixed shear blade, a vertically reciprocating cutting blade coöperating therewith, a table to receive the severed portion of the web, means for moving the severed portion forward, slots in said table, fingers passing through said slots, for moving the severed portion at a right angle to the line of its first movement, a gum receptacle, a roller revolving in said receptacle, a rocking frame carrying rollers acting upon the upper surface of the severed portion to press the underside thereof into contact with the gum roller, a plate pivotally mounted upon a rigid support, a cam surface on said plate, a second plate carried by the frame having the rollers, mechanism for rolling the severed portion to form a cylinder, mechanism for removing the cylinder from the rolling mechanism, and means for receiving it after removal.

Signed in the presence of the two undersigned witnesses.

EDWARD COLSTON LOVELL.

Witnesses:
  E. J. FUSSELL,
  E. TYLER.